(No Model.)
W. H. COOK.
TREE SUPPORT.
No. 499,520. Patented June 13, 1893.
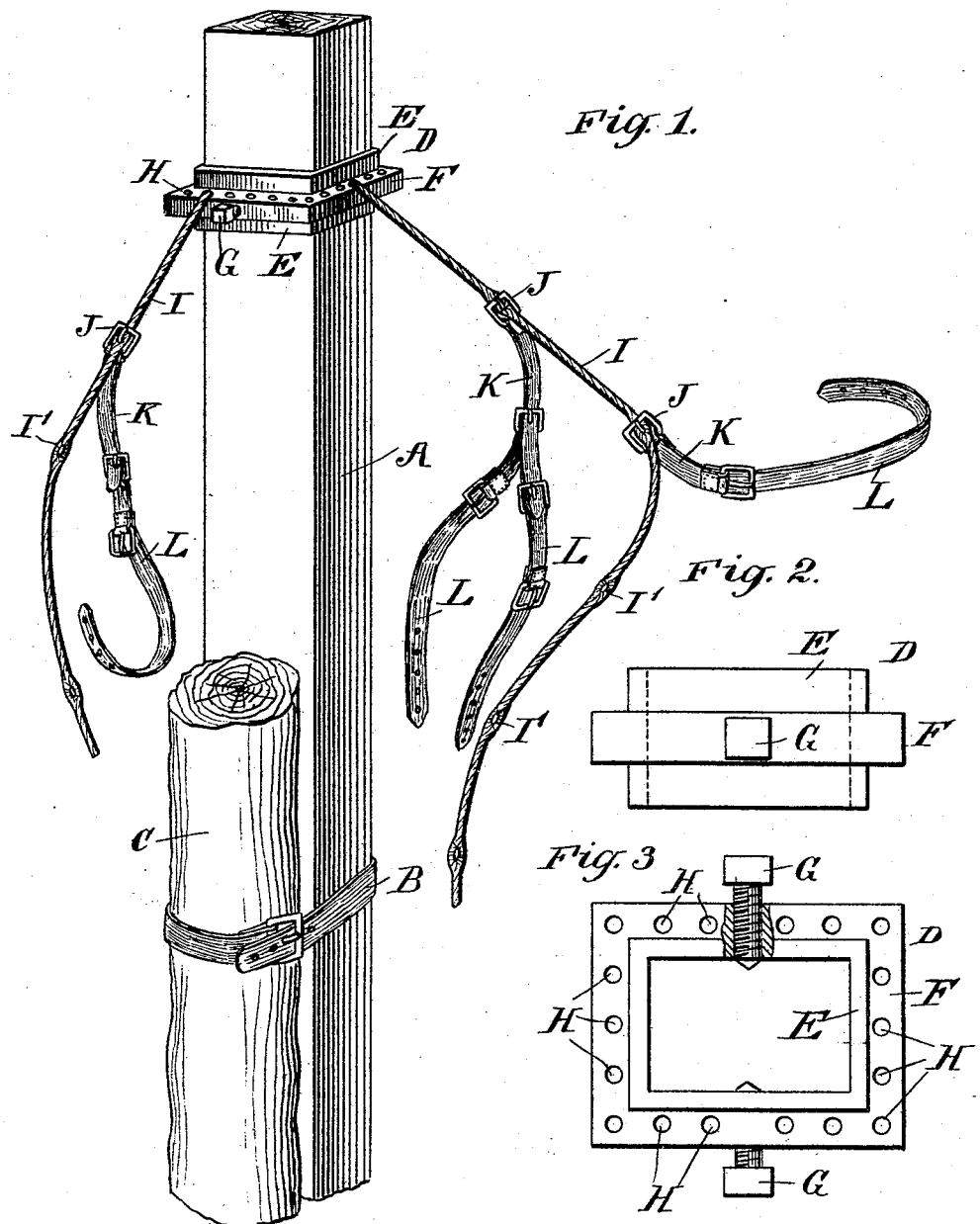
WITNESSES:
INVENTOR:
ATTORNEYS

UNITED STATES PATENT OFFICE.

WILLIAM HOLLOMBY COOK, OF RIVERSIDE, CALIFORNIA, ASSIGNOR OF ONE-HALF TO ELI C. LOVE, OF SAME PLACE.

TREE-SUPPORT.

SPECIFICATION forming part of Letters Patent No. 499,520, dated June 13, 1893.

Application filed January 19, 1892. Serial No. 418,532. (No model.)

*To all whom it may concern:*

Be it known that I, WILLIAM HOLLOMBY COOK, of Riverside, in the county of San Bernardino and State of California, have invented a new and Improved Tree-Support, of which the following is a full, clear, and exact description.

The object of the invention is to provide a new and improved tree support, which is simple and durable in construction, easily applied, and designed to securely prop up and support heavily laden branches of fruit and other trees, shrubbery, and the like.

The invention consists of certain parts and details and combinations of the same, as will be fully described hereinafter and then pointed out in the claims.

Reference is to be had to the accompanying drawings forming a part of this specification, in which similar letters of reference indicate corresponding parts in all the figures.

Figure 1 is a perspective view of the improvement. Fig. 2 is an enlarged side elevation of the frame; and Fig. 3 is a plan view of the frame, with parts in section.

The improved tree support is provided with a pole A, adapted to be fastened by straps B, or other means, to the trunk C, of the tree, the branches of which are to be supported by the device. Instead of fastening the pole A, however, to the trunk C, it may be set in the ground or supported in any other suitable manner.

On the pole A is held adjustably, a frame D, preferably of the construction shown, being provided with a sleeve E, fitted to slide on the pole and provided with an outwardly extending flange F, and with one or more set screws G, for fastening the sleeve in place after it is adjusted to the proper position on the pole A. In the flange F are formed series of holes H, each of which is adapted to be engaged by the end of a cable, wire or rod I, bent or formed with a hook for the purpose; each cable is provided with a series of holes I', engaged by a buckle J of a strap K, carrying a strap or straps L, fastened to the branches of the tree to be supported. Each of the straps K and the depending straps L are made of such suitable material as not to injure the branches of the tree when applied. Rope or heavy twine may be used instead of the straps K. It will be seen that the cable, wire or rod I can be extended downward and outward from the frame D, to bring the respective straps K and L to the desired branch to be supported and propped up, the strap L being fastened around the branch to hold the latter in position. It will be seen that a series of straps K can be attached on a single cable, wire or rod I for attachment to the same branch, or a series of adjacent branches, as the case may require. It is further understood that a series of frames D may be held on the same pole A, one above the other, to support branches located higher up or lower down upon the tree.

It is understood that the set screws G permit of adjusting the frame D on the pole A, so as to give the proper inclination to the cables, wires or rods I to support the branches, as above described. The pole A may be made of solid iron or gas pipe, and the frame D changed to fit same.

Having thus described my invention, I claim as new and desire to secure by Letters Patent—

1. A tree support comprising a frame having an apertured flange and provided with means for securing it to a pole, rods or cables engaging the apertures of the said flange and provided with holes, and straps provided with buckles engaging the holes of the rods or cables, substantially as described.

2. The herein described tree support, consisting of the frame D having the apertured flange F and provided with the set screws G, the rods or cables I provided with the holes I', the straps K provided with the buckles J engaging the apertures of the rods or cables and the straps L secured to the straps K as specified.

WILLIAM HOLLOMBY COOK.

Witnesses:
E. C. LOVE,
C. C. SHOW.